(No Model.)
C. F. WHITNEY.
CULINARY UTENSIL.
No. 385,688. Patented July 3, 1888.
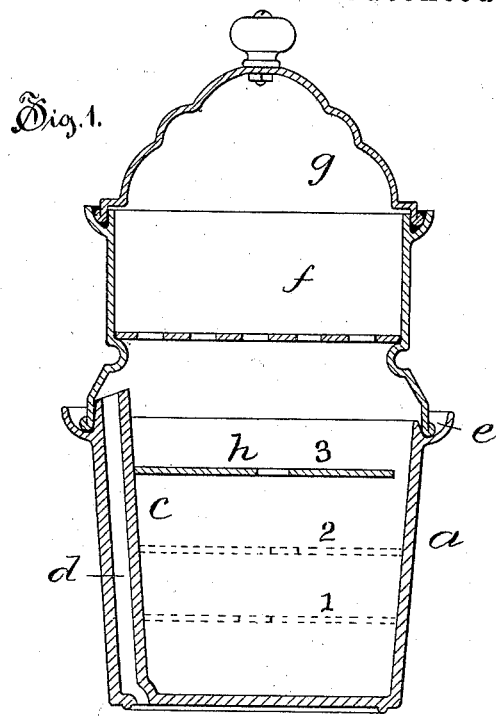
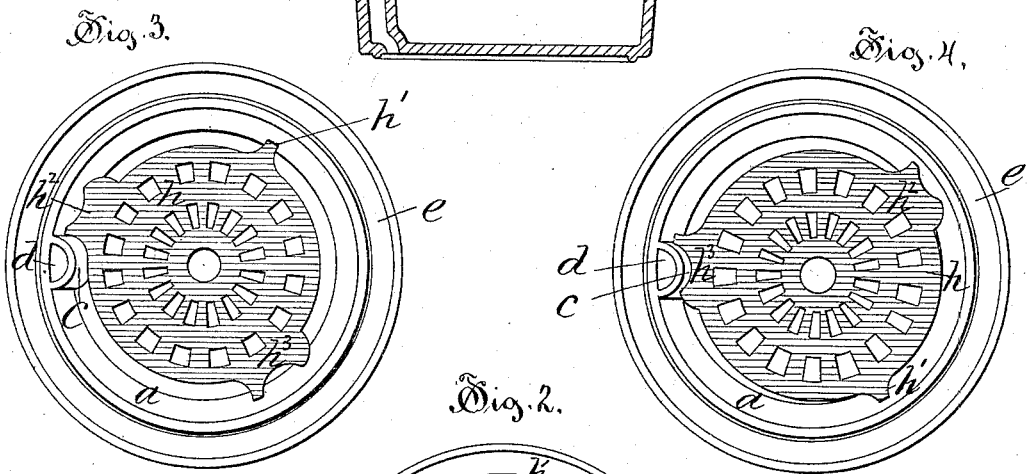
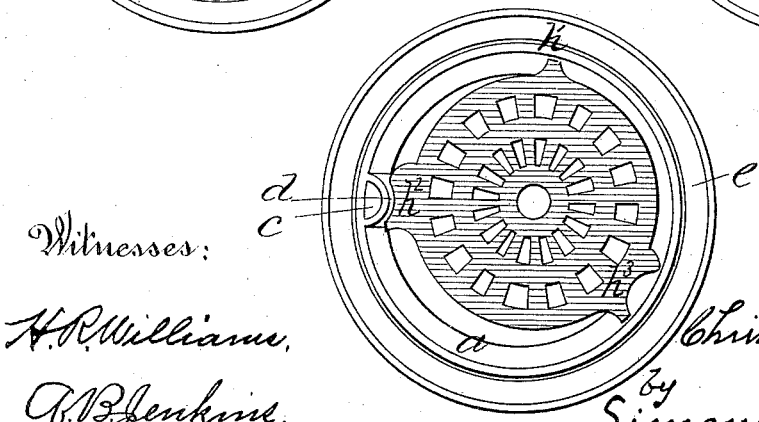
Witnesses:
H. R. Williams.
A. B. Jenkins.
Inventor,
Christopher F. Whitney.
by Simonds & Burdett
Attys.

UNITED STATES PATENT OFFICE.

CHRISTOPHER F. WHITNEY, OF NEWTON, ASSIGNOR TO HILL, WHITNEY & CO., OF BOSTON, MASSACHUSETTS.

CULINARY UTENSIL.

SPECIFICATION forming part of Letters Patent No. 385,688, dated July 3, 1888.

Application filed October 11, 1887. Serial No. 252,018. (No model.)

*To all whom it may concern:*

Be it known that I, CHRISTOPHER F. WHITNEY, of Newton, in the county of Middlesex and State of Massachusetts, have invented certain new and useful Improvements in Culinary Utensils, of which the following is a full, clear, and exact description, whereby any one skilled in the art can make and use the same.

The object of my invention is to provide a kettle with means for providing a chamber of varying capacity in the upper part of the kettle for the reception of articles to be steamed; and to this end my improvement consists in the combination of a kettle having on the inside a vertical flange with an adjustable disk having on its edge a plural number of bearing points or projections and one or more peripheral sockets, into which the said flange may project; and it further consists in details of the cooking utensil with the inside flange and the adjustable disk, as more particularly hereinafter described, and pointed out in the claims.

Referring to the drawings, Figure 1 is a view, in vertical central section, of a kettle embodying my improvement. Fig. 2 is a plan view of the same, showing the adjustable disk in place. Figs. 3 and 4 are diagram views showing the disk adjusted to different positions within the kettle.

In the accompanying drawings, the letter *a* denotes a kettle having on the inner wall the upright inward-projecting flange *c*, that in this instance is formed by the wall of the odor-tube *d*, that leads from the upper edge of the kettle down through the bottom, for the purpose of providing an outlet from the kettle for odors that are produced in cooking whatever is in the kettle. The upper edge of the kettle, as shown, is provided with a water-seal, *e*, and into this seal is fitted the flanged edge of a cover or of an extension of the kettle made up of the steamer *f*, which is provided with a suitable cover, *g*.

The adjustable disk *h* is made, preferably, of metal, as iron, cast to shape, and is supported in the kettle by the contact of the edge of the disk or of projections on it with the wall of the kettle. This disk is provided with a number of peripheral projections, $h'$ $h^2$ $h^3$, and when the disk is placed so that the ends of these projections bear against the wall of the kettle the disk will be in its lowermost position in the kettle, as shown at 1 in Fig. 1 of the drawings. By placing the disk in the kettle so that the socket formed in the projection $h^2$ bears against the inner edge of the flange or wall *c* the disk will be held in the kettle on a plane denoted by the dotted line 2 of Fig. 1 of the drawings, and when the disk is placed in position so that the socket in the projection $h^3$ rests against the wall of the projection *c*, while the other peripheral projections rest against the wall of the kettle, the disk will be supported in the position denoted by the full line 3 in Fig. 1 of the drawings. A disk provided with a plural number of projections, as described, is thus capable of adjustment in varying positions by the contact of the bearing-edges with the inner wall of the kettle, and there is thus provided a cheap and convenient means for adjusting the capacity of the kettle above the disk for holding any vegetable or other article of food that it may be desirable to cook, as by steaming, while another article may be boiled in the water placed in the space below the disk.

It is not essential to the embodiment of my invention that the sockets in the edge of the disk should be formed in the several projections, as two or more sockets may evidently be grouped together near each other and afford the same means of adjustment of the disk to varying positions so long as the sockets are of different depths; and it is also evident, as the disk in its lowermost position rests upon the ends of all of the projections, that with but a single socket the disk will be capable of at least one adjustment or change of position to a higher position in the kettle, and I do not limit my invention to the use of the plural number of sockets.

This adjustable disk may be used in a kettle having an odor-tube, the wall of which forms the inner projection, or a common kettle may be provided with an inward-projecting flange that has the same office, and the kettle may be one of ordinary make, or one adapted for use with an extension or steamer, *f*, the upper part of the kettle serving as one steamer, while the extension forms a more commodious steamer for other articles that may all be cooked at one time in the same kettle. When a kettle is used having an odor-tube, I have found that different vegetables and meats may be cooked at one time in the kettle without imparting any odor or taste of the one to any other of the contents.

I claim as my invention—

1. In combination with the kettle $a$, having within it the upright projecting flange $c$, the adjustable disk $h$, having a plural number of peripheral projections with sockets of different depths adapted to rest against the inner edge of the flange $c$, all substantially as described.

2. In combination with the kettle $a$, or like cooking utensil, having the inward-projecting flange, an adjustable disk having a plural number of peripheral bearing-points and a peripheral socket adapted to receive the said flange that projects within it and forms one point of rest or support for the disk in one of its positions of vertical adjustment in the kettle, all substantially as described.

CHRISTOPHER F. WHITNEY.

Witnesses:
WALTER N. BUFFUM,
ROBERT T. BABSON.